Dec. 27, 1960  H. H. CHRISTENSEN  2,966,142
CONSTANT PRESSURE HYDRAULIC SERVO SYSTEM
HAVING VARIABLE DISPLACEMENT DEVICE
Filed April 5, 1957
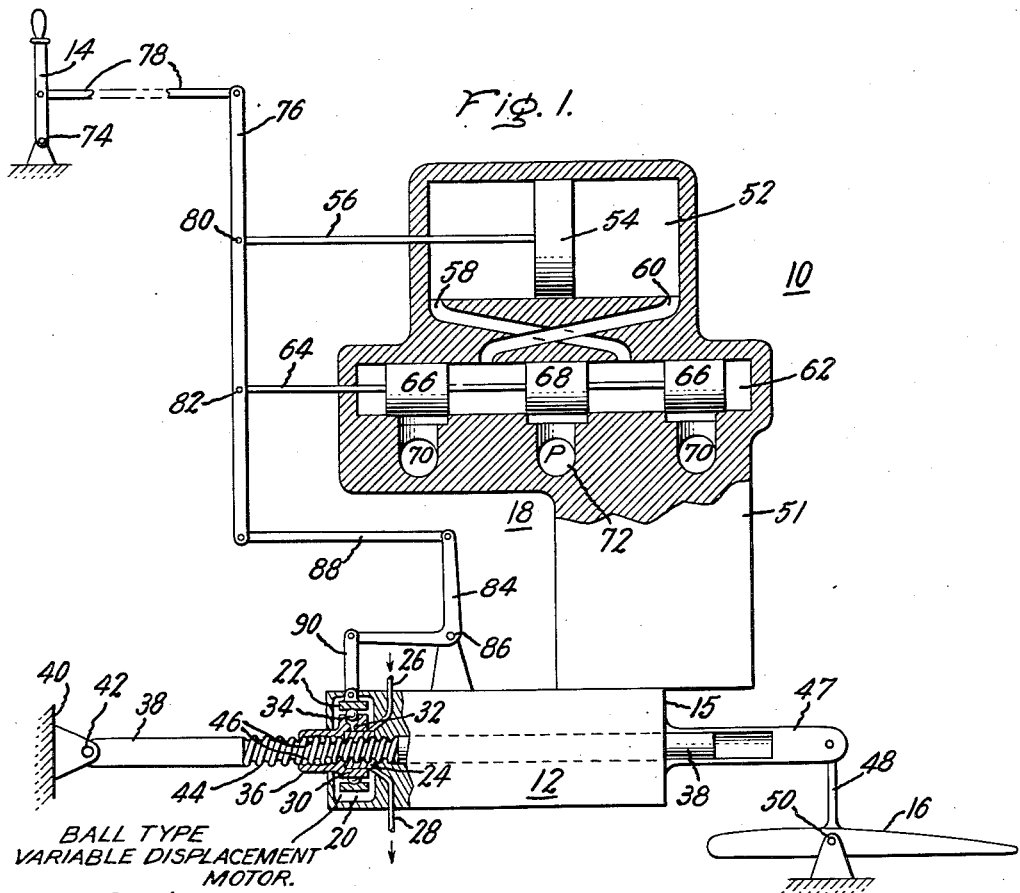
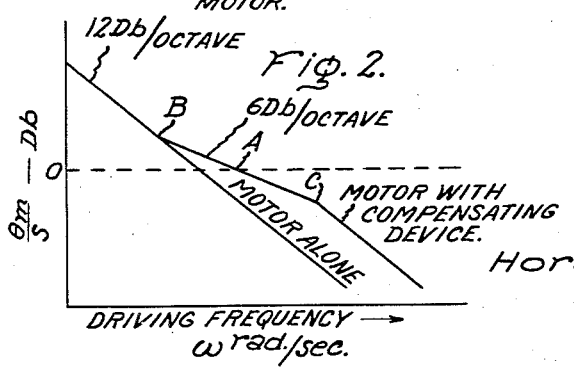
Inventor:
Horace H. Christensen,
by Roe D. McBurnett
His Attorney.

2,966,142
Patented Dec. 27, 1960

2,966,142

CONSTANT PRESSURE HYDRAULIC SERVO SYSTEM HAVING VARIABLE DISPLACEMENT DEVICE

Horace H. Christensen, Schenectady, N.Y., assignor to General Electric Company, a corporation of New York Filed Apr. 5, 1957, Ser. No. 651,091

6 Claims. (Cl. 121—41)

The present invention relates to a hydraulic motor servo device and more particularly to a variable displacement hydraulic motor having a mechanical-hydraulic compensating network as a position servo.

In general, the present invention provides means for using a variable displacement hydraulic device to provide mechanical motion and to control this motion. Thus, the particular device can be used to position such loads as flight control systems, turret drives, antenna drives, or the like. In particular, the invention has special usefulness in an aircraft, or similar machines, where a constant pressure hydraulic supply is available and where it is desirable to position a load in response to a control signal.

The use of variable displacement hydraulic devices as pumps is well known and, as such, these devices are utilized as the input end of hydraulic transmissions for variable displacement flow sources, and with suitable controls, are used as constant pressure pumps. Further, certain types of differential transmissions, such as alternator drives, have a variable displacement output end which under some operating conditions operates as a motor. In this manner, such transmissions provide a constant speed on the output end, but do not provide an output position and do not operate from a constant pressure hydraulic supply.

Accordingly, conventional constant pressure systems, in order to provide the energy necessary to position a load, employ a valve controlled hydraulic motor or linear actuator. In these cases, position feedback is provided either by a mechanical arrangement, such as an aircraft surface actuator, or electrically as is commonly the case in gun turret controls. However, these types of hydraulic motors or linear actuators have two rather severe limitations wherein there is excessive hydraulic power consumption for the work performed, and hydraulic resonance which prevents the use of high loop gains in systems where the load has high inertia.

For example, a valve is a throttling device and when used for control purposes, the efficiency of the operation can never exceed a theoretical maximum of 66⅔ percent. In practice, the operation of a valve controlled hydraulic motor or linear actuator in the duty cycles encontered gives efficiencies ranging down to values approaching zero. To illustrate this feature, a twenty horsepower valve controlled hydraulic motor operating unloaded at rated speed, for example, will be using thirty horsepower while doing zero work.

With respect to the above-mentioned second severe limitation, hydraulic resonance is caused by the compressibility of the fluid contained between the control valve and actuator pistons. This phenomenon will cause system instability in a closed loop system and often is the limiting item on setting or determining the loop gain in a hydraulic servo system.

Briefly, the present invention provides means for reducing hydraulic power consumption and means for eliminating hydraulic resonance to thereby provide increased positional accuracy. Specifically, one embodiment of the invention comprises a variable displacement hydraulic unit, such as a motor, along with the necessary control structure. Also, every load to be driven by this embodiment will have inertia; therefore, the output torque of the motor must be equal to the torque required to move the load with the required acceleration.

In a variable displacement motor control of power to the load is accomplished within the motor itself. Hence, changing the displacement of the motor varies the capacity or ability of the motor to furnish torque to the load. Further, a variable displacement motor is a torque unit since the output torque is a direct function of the stroke of the motor. Consequently, the flow required by the motor is proportional to the motor speed and the amount of stroke.

The variable displacement motor as used in a power drive system assumes an adequate supply of constant pressure fluid. Thus, for any given stroke the motor will attain a steady-state velocity at which the motor torque just equals the viscous drag torque, so that an increase of stroke will give acceleration. To decelerate the unit, the stroke is reduced so that the viscous drag plus reverse stroking gives the required deceleration. Further, if the stroke is reversed through zero during deceleration, the hydraulic unit functions as a pump, pumping oil from the return line back into the high pressure supply line.

The equation or transfer function for this type of servo unit is derived by writing a torque balance for the unit coupled to a load. Hence, assuming an inertia load and a viscous drag proportional to speed, the output torque of the variable displacement hydraulic motor operating on a constant pressure supply is proportional to the stroke. The differential equation of torque expressed in transfer function is as follows:

$$\frac{\theta_m}{S}=\frac{K}{Ip^2}$$

where:

$\theta_m$=output
$S$=stroke
$K$=torque constant
$I$=inertia
$p$=differential operator An inspection of the transfer function indicates that there is no hydraulic resonance present in this type of servo, since there are no parameters which are a function of the hydraulic spring or entrained fluid volume between the controlling and controlled units, as in conventional pump-motor and valve-piston type of servos. This is due to the fact that the control and the hydraulic to mechanical conversion takes place within one unit.

The present variable displacement motor type of servo is characterized by a 180° phase shift at all frequencies requiring a control different than that used in conventional power drive systems. If this type of servo device was used in a position servo with a simple feedback, an unstable operation would result. A stable operation can be accomplished by either mechanical-hydraulic or electrical stabilizing networks, hereinafter disclosed.

In the present invention, the aforementioned unstable operation is prevented by the use of a suitable lead-lag device, and hydraulic resonance is eliminated since there is no fluid in the servo loop, and the open loop transfer function, as indicated above, shows no resonant terms.

An object of the present invention is the provision of a variable displacement hydraulic motor to drive a load under all operating conditions.

Another object is to provide means for utilizing a variable displacement hydraulic unit to provide mechanical motion and to control this motion.

A further object of the invention is the provision of a variable displacement hydraulic unit wherein excessive hydraulic power consumption for work performed is substantially reduced.

Another object is to provide a variable displacement hydraulic unit wherein hydraulic resonance, preventing the use of high loop gains in systems where loads have high inertia, is eliminated.

Other objects and many of the attendant advantages of this invention will be readily appreciated as the same becomes better understood by reference to the following detailed description when considered in connection with the accompanying drawing in which like reference numerals designate like parts throughout the figures thereof and wherein:

Figure 1 is a schematic view, partly in section, of a preferred embodiment of the invention; and Figure 2 is an open loop attenuation diagram of the variable displacement hydraulic motor alone, and of the hydraulic motor with compensating device.

Referring now to the drawing, there is illustrated a preferred embodiment 10 comprising a moveable hydraulic housing unit 12 operatively coupled to an input signal means, such as manual lever 14, or the like, and through an end 15 to an output, such as an aircraft surface component 16. The hydraulic housing unit 12 is connected to the input 14 by a mechanical-hydraulic lead-lag device 18, hereinafter disclosed.

A variable displacement hydraulic motor 20 is provided within the housing unit 12, comprising a single lobe hydraulic ball pump unit of the type specifically illustrated and disclosed in "Ball Pump With Reduced Stroking Effort" by John R. Granan, Serial No. 607,927, filed September 4, 1956, and in "Radial Hydraulic Ball Pump With Slanted Cylinders" by John P. May, Serial No. 598,149, filed July 16, 1956, now Patent No. 2,823,619, issued February 18, 1958, both assigned to the same assignee as the present invention. The hydraulic motor 20 is provided with an adjustable race member 22 and with a stationary pintle 24 integral with the housing unit 12, and further provided with a constant pressure fluid supply conduit 26 and low pressure return fluid conduit 28.

A cylinder member 30 is provided rotatably mounted on the pintle 24, and formed with a plurality of radial bores 32 cooperating with radially moveable piston balls 34. An internally threaded nut member 36 is integrally formed with the cylinder 30 and rotatable therewith, as hereinafter disclosed. A screw jack 38 is provided fixed at one end to a stationary member 40, part of the particular installation at hand, through a pivot 42, and having a threaded portion 44 at the other end threadably engaging the nut 36 through a number of intercoacting ball bearings 46.

In this manner, the screw jack 38 extends through the housing unit 12 and the internally mounted variable displacement hydraulic motor 20. Thus, the unit 12 will have a predetermined amount of axial movement relative to the stationary screw jack 38. The end 15 of the unit 12 is formed with an axially extending screw jack receptacle 47 pivotally connected to the aircraft surface 16 through an interconnecting link member 48. In this manner, axial movement of the unit 12 along the threaded portion 44 of the screw jack 38 will predeterminedly pivot the surface member 16 about a pivot point 50.

The motor 20 operates in a manner similar to that disclosed in the Rauch patent, No. 2,453,538. Whereas the Rauch patent disclosure is indicated to operate as a pump, the structure disclosed is adapted for use as a motor in the manner of the motor 20 of the present disclosure. Constant pressure fluid is supplied through conduit 26 to the stationary pintle 24 and is discharged through bores 32 of rotatable member 30 thereby forcing piston balls 34 against the race 22. It will be understood that when the adjustable race member 22 is moved to an eccentric position the power of the piston balls 34 on the race will thereby provide rotation of rotatable member 30. This in turn causes nut member 36 to rotate about the threaded portion 44 of screw jack 38 thus causing axial movement of the unit 12.

The lead-lag or compensating device 18 comprises a casing 51 secured to the housing unit 12 containing a power piston assembly 52 including a piston 54 having an integral piston rod 56 axially slideable therein, and having a pair of conduits 58 and 60 operatively coupling the power piston assembly to a pilot valve 62 provided within said casing. The pilot valve 62 is provided with a valve stem 64 having a number of drain lands 66 and a supply land 68 operatively coacting with drain outlets 70 and with a constant pressure fluid supply inlet 72, respectively. The supply inlet may be coupled to a source of constant pressure fluid such as the supply source connected to the conduit 26 of the variable displacement hydraulic motor 20.

The input signal lever 14 is pivotally mounted to a fixed pivot point 74 and coupled to a vertical control rod 76 through an interconnecting lever 78. The vertical control rod is pivotally coupled at a pivot point 80 to the piston rod 56 and pivotally coupled to the valve stem 64 at pivot point 82. A bell crank 84 is pivotally mounted on the housing unit 12 through pivot point 86, and pivotally coupled to the vertical control rod 76 through a pivotally mounted interconnecting lever 88. Further, the bell crank 84 is pivotally coupled to the race 22 of the variable displacement hydraulic motor 20 by an intermediate pivoting lever 90.

Figure 2 shows two curves, one representing an open loop attenuation diagram of the hydraulic motor 20 alone, and the other representing an open loop attenuation of the hydraulic motor with the compensating device 18 operatively coupled thereto and with the screw jack 38 disconnected from the pivot point 40. Thus, Figure 2 indicates the stability equation for the preferred embodiment 10 in an open loop configuration which would insure that for a gain which allows the zero decibel and the six decibel per octave relationship to coincide, as shown at point "A," there is sufficient phase margin for stable operation when the screw jack 38 is again pivotally coupled to the support 40.

In the operation of the preferred embodiment 10, when the signal input lever 14 is moved, the vertical control lever 76 pivots about the pivot point 80 since the piston 54 offers the greatest resistance due to the fluid within the power piston assembly 52. This initial movement will also cause a displacement of the pilot valve 62 away from the center null position, as shown in Figure 1, which in turn will cause a corrective movement of the piston 54 since fluid will flow from the supply conduit 72 through either conduit 58 or 60, depending on the direction of input signal. Therefore, the vertical rod 76 will transmit the input signal movement plus the compensating action to the bell crank 84 and to the stroking mechanism of the variable displacement motor 20. This results in the motion of rod 76, which will quickly return the pilot valve 62 to the null position. Thus, for low frequencies, below point "B" of Figure 2, the compensating device 18 allows the rod 76 to pivot about pivot point 82. At high frequencies, above point "C" of Figure 2, beyond the capabilities of the device 18, the rod 76 pivots about point 80, thereby providing the compensating action for the embodiment 10. At low frequencies, the high response of the servo device disclosed will effectively maintain pilot valve 62 in its null position therefore, rod 76 can be considered to pivot about the pivot point 82. However, at high frequencies the piston 54 is unable to follow the movements due to the resistance of the fluid within the power piston assembly 52, therefore, at high frequencies the piston 54 effectively remains stationary and the rod 76 pivots about the pivot point 80.

The reaction of the preferred embodiment 10 to the transient load torques is entirely dependent on the stroke of the variable displacement hydraulic motor 20, so that it is imperative that the control loop has high gain and fast response. The addition of the compensating device 18 to the hydraulic motor 20 endows the system with high gain and fast response with relation to the control of the variable displacement of the motor. Further, the compensating device 18 can be suitably constructed for proper selection of gain and feedback ratio so that suitable selection of such dynamic characteristics will provide the necessary phase lead to provide a stable position servo when used with the variable displacement hydraulic unit 12.

Hence, the present invention will be stable and will provide the torque necessary to position a load in accordance with the input signal at 14. Further, position feedback is provided by allowing the hydraulic housing unit 12 to move with the load. It will be understood, of course, that other means such as the use of differential links, gears, and the like can be utilized to afford suitable compensation in accordance with the principles of the present invention.

The theoretical efficiency of the preferred embodiment 10 is raised to 100 percent since all the pressure drop occurs across the variable displacement motor 20 and no throttling is present. The actual efficiency will, of course, be less than the theoretical by the amount of loss in the motor, but for typical duty cycles the efficiency will approach 100 percent instead of zero percent as in conventional systems presently utilized. The efficiency mentioned above relates to the output obtained from the motor relative to its input. As hereinbefore pointed out under a no load condition a valve controlled hydraulic motor operated at rated speed will have zero efficiency. In the present invention regardless of load the same output will be obtained for a given input. Therefore, lightly loaded conventional valve control hydraulic motor approaches zero efficiency, whereas the present invention when lightly loaded will approach 100% efficiency. Thus, a variable displacement unit utilized as a motor in a position servo system with a compensating device provides an efficient and economical positioning device, wherein the compensating device provides the necessary stability to such use of a variable displacement hydraulic motor.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims.

What is claimed is:

1. A constant pressure hydraulic system for deriving a mechanical motion and control thereof comprising an input signal means, a variable displacement hydraulic motor having an adjustable race member, an output means, a lead-lag compensating device associated with said motor and operatively coupling said input signal means to said adjustable race member to insure sufficient phase lead in the system for stable operation, and mechanical means operatively coupling said motor and output means to transmit a predetermined output equivalent to a specific input.

2. A constant pressure system comprising an input signal means, a power piston assembly including a piston head and a piston rod, a pilot valve having a valve stem parallel to said piston rod, a compensating housing unit having said power piston assembly and pilot valve mounted therein in parallel relationship, a hydraulic housing unit fixed to said compensating housing unit for coaction therewith, a variable displacement hydraulic motor mounted within said hydraulic housing unit and having a strokable race moveable therein, bell crank means pivotally mounted on said hydraulic housing unit and mechanically coupled to said race for coordinated motion therebetween, a first lever means coupling said input signal means to said piston rod and to said valve stem, a second lever means coupling said bell crank means to said first lever means for stroking said variable displacement hydraulic motor in accordance with said input signal means, a threaded screw jack pivotally fixed at one end thereof to a stationary member and coaxially mounted relative to said motor, nut means mounted for rotation with said motor and coaxially coupled to said screw jack for movement of said hydraulic housing unit and said compensating housing unit thereon, and an output member mechanically coupled to said hydraulic housing unit.

3. A constant pressure servo system comprising a variable displacement motor having a mutually coacting strokable race and cylinder member, said cylinder member having a nut member mounted for rotation therewith, non-rotating screw means operatively coacting with said nut member for movement of said motor thereon, a lead-lag device operatively coupled to said strokable race and having predetermined gain and feedback ratio to provide a suitable phase compensation for stable operation of said motor, and an output member operatively coupled to said motor for actuation of the output member in response to said lead-lag device.

4. A servo system having a variable displacement motor, a lead-lag device operatively coupled to said motor, an input signal means mechanically coupled to said lead-lag device and to said motor, a nonrotating screw jack operatively coupled to said motor for relative coaxial movement therebetween, and output means mechanically connected to said motor for movement in response to said input signal means.

5. A constant pressure servo system comprising a variable displacement hydraulic motor, an input signal means operatively coupled to said motor, a mechanical-hydraulic lead-lag device coupled to said input signal means and to said motor to prevent instability by supplying a sufficient phase compensation in the system, said motor having an adjustable race member and a cylinder member coaxial therewith, said cylinder member having a plurality of radially moveable balls operatively responsive to said adjustable race member in response to said input signal means to predeterminedly actuate said motor, an output member moveable in response to said motor, a threaded nut member fixed to said cylinder and rotatable therewith, a stationary screw member threadably engaging said nut and arranged to permit movement of said motor and lead-lag device thereon to provide a position feedback in the system.

6. A constant pressure system comprising a power piston assembly having a piston head and a piston rod axially slideable therein, a pilot valve having a valve stem axially slideable therein, a control rod pivotally coupled to said piston rod and said valve stem, a variable displacement motor fixed relative to said power piston assembly and said pilot valve, a bell crank pivotally coupling said control rod to said motor, signal input means operatively coupled to said control rod for predeterminedly varying the stroke of said motor, the relationships between said power piston assembly and said pilot valve being such that at low frequencies of operation said control rod pivots about the pivot point with said piston rod and at high frequencies about the pivot point with said valve stem to provide the torque necessary to position a load in accordance with said signal input means.

References Cited in the file of this patent

UNITED STATES PATENTS 2,803,221    Walker et al. _____ July 20, 1957

FOREIGN PATENTS 42,494    France _____ May 8, 1933
            (Addition to No. 724,287)